(12) United States Patent
Xu et al.

(10) Patent No.: US 7,108,930 B2
(45) Date of Patent: Sep. 19, 2006

(54) FUEL CELLS

(75) Inventors: Zhiqiang Xu, Bloomfield, NJ (US); Zhigang Qi, North Arlington, NJ (US); Arthur Kaufman, West Orange, NJ (US)

(73) Assignee: Plug Power, Inc., Latham, NY (US)

( * ) Notice: Subject to any disclaimer, the term of this patent is extended or adjusted under 35 U.S.C. 154(b) by 364 days.

(21) Appl. No.: 10/739,723

(22) Filed: Dec. 17, 2003

(65) Prior Publication Data

US 2005/0136295 A1  Jun. 23, 2005

(51) Int. Cl.
*H01M 8/04* (2006.01)
*H01M 8/00* (2006.01)
*H01M 8/10* (2006.01)

(52) U.S. Cl. ............................. 429/13; 429/17; 429/32

(58) Field of Classification Search .................. None
See application file for complete search history.

(56) References Cited

U.S. PATENT DOCUMENTS

| | | | |
|---|---|---|---|
| 4,166,143 A | 8/1979 | Petrow et al. | |
| 4,876,115 A | 10/1989 | Raistrick | |
| RE33,149 E | 1/1990 | Petrow et al. | |
| 5,211,984 A | 5/1993 | Wilson | |
| 5,723,173 A | 3/1998 | Fukuoka et al. | |
| 5,728,485 A | 3/1998 | Watanabe et al. | |
| 6,309,772 B1 | 10/2001 | Zuber et al. | |
| 6,329,092 B1 * | 12/2001 | Maeda et al. | 429/23 |
| 2003/0022033 A1 * | 1/2003 | Stimming et al. | 429/12 |

OTHER PUBLICATIONS

Fedkiw, P.S. et al., "Pulsed-potential Oxidation of Methanol," J. Electrochemical Society vol. 135 No. 10, pp. 2459-2464, 1988.*
U.S. Appl. No. 10/072,592, filed Feb. 11, 2002, Qi et al.
U.S. Appl. No. 10/097,216, filed Mar. 14, 2002, He et al.
Poltarzewski et al., "Nafion Distribution in Gas Diffusion Electrodes for Solid-Polymer-Electrolyte-Fuel-Cell Applications", *J. Electrochem. Soc.*, 139(3):761-765 (1992).
Ticianelli et al., "Methods to Advance Technology of Proton Exchange Membrane Fuel Cells", *J. Electrochem. Soc.* 135(9):2209-2214 (1988).

* cited by examiner

*Primary Examiner*—Michael Barr
*Assistant Examiner*—Karie O'Neill
(74) *Attorney, Agent, or Firm*—Fish & Richardson P.C.

(57) ABSTRACT

In one aspect, the invention features a method including sorbing carbon monoxide to a catalyst layer of a fuel cell, and oxidizing the carbon monoxide. The method can be used to pre-condition or activate the catalyst layer.

22 Claims, 7 Drawing Sheets

FUEL CELLS

TECHNICAL FIELD

The invention relates to fuel cells, fuel cell systems, and methods of operating the cells and systems.

BACKGROUND

A fuel cell can convert chemical energy to electrical energy by promoting electrochemical reactions between two reactants.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas diffuses through the anode gas diffusion layer and interacts with the anode catalyst. Similarly, as the cathode gas flows through the channels of the cathode flow field plate, the cathode gas diffuses through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the anode reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load, to the cathode flow field plate, and to the cathode side of the membrane electrode assembly.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, hydrogen flows through the anode flow field plate and undergoes oxidation. Oxygen flows through the cathode flow field plate and undergoes reduction. The specific reactions that occur in the fuel cell are represented in equations 1–3.

$$H_2 \rightarrow 2H^+ + 2e^- \qquad (1)$$

$$1/2 O_2 + 2H^+ + 2e^- \rightarrow H_2O \qquad (2)$$

$$H_2 + \tfrac{1}{2} O_2 \rightarrow H_2O \qquad (3)$$

As shown in equation 1, hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to fuel cells, fuel cell systems, and methods of operating the cells and systems.

Prior to operating a fuel cell or a fuel cell system under its operating conditions, the cell or system sometimes undergoes a "break-in" or pre-conditioning period. During this period, the performance of the cell or the system increases. When the performance of the cell or the system reaches an optimum performance, the cell or the system is operated under its selected operating conditions. In one aspect, the invention features a method that can be used as a pre-conditioning method to enhance the performance of a fuel cell or a fuel cell system. The method includes sorbing a material (such as carbon monoxide) to the anode catalyst and/or the cathode catalyst, and desorbing the material (such as by oxidizing the carbon monoxide to carbon dioxide). The method is capable of enhancing performance, it is believed, by increasing the surface area of the catalyst(s), thereby increasing catalyst utilization. The method can be completed relatively quickly (e.g., less than one hour).

In another aspect, the invention features a method including sorbing carbon monoxide to a catalyst layer of a fuel cell, and oxidizing the carbon monoxide.

Embodiments of aspects of the invention may include one or more of the following features. During sorption of carbon monoxide, the method further includes maintaining the potential of the catalyst layer at a first potential (e.g., from about 0.2 to about 0.5V versus a standard hydrogen electrode) less than the oxidation potential of carbon monoxide. The method includes electrochemically oxidizing the carbon monoxide, e.g., including scanning the potential of the catalyst layer. Alternatively or in addition, the method includes chemically oxidizing the carbon monoxide, e.g., by contacting the catalyst layer with oxygen or water. After oxidizing the carbon monoxide, the method can further include sorbing carbon monoxide to the catalyst layer, and oxidizing the carbon monoxide.

The method can further include contacting the catalyst layer with a fuel, e.g., hydrogen or methanol, and/or with an oxidant.

The method can further include incorporating the fuel cell into a fuel cell stack. The fuel cell can be a part of a fuel cell stack. The fuel cell can include a proton-exchange membrane.

In another aspect, the invention features a method including sorbing a first material other than a fuel to a catalyst layer of a fuel cell, and oxidizing the first material from the catalyst layer.

The method can include electrochemically and/or chemically oxidizing the first material. Sorbing and oxidizing of the first material can be performed repeatedly. The method can include incorporating the fuel cell into a fuel cell system. The fuel cell can be a part of a fuel cell stack. The first material can include carbon monoxide.

In another aspect, the invention features a method including desorbing carbon monoxide from a catalyst layer of a fuel cell. The carbon monoxide can be desorbed electrochemically and/or chemically.

Other aspects, features and advantages of the invention will be apparent from the description of the preferred embodiments thereof and from the claims.

DETAILED DESCRIPTION

Figure 1:
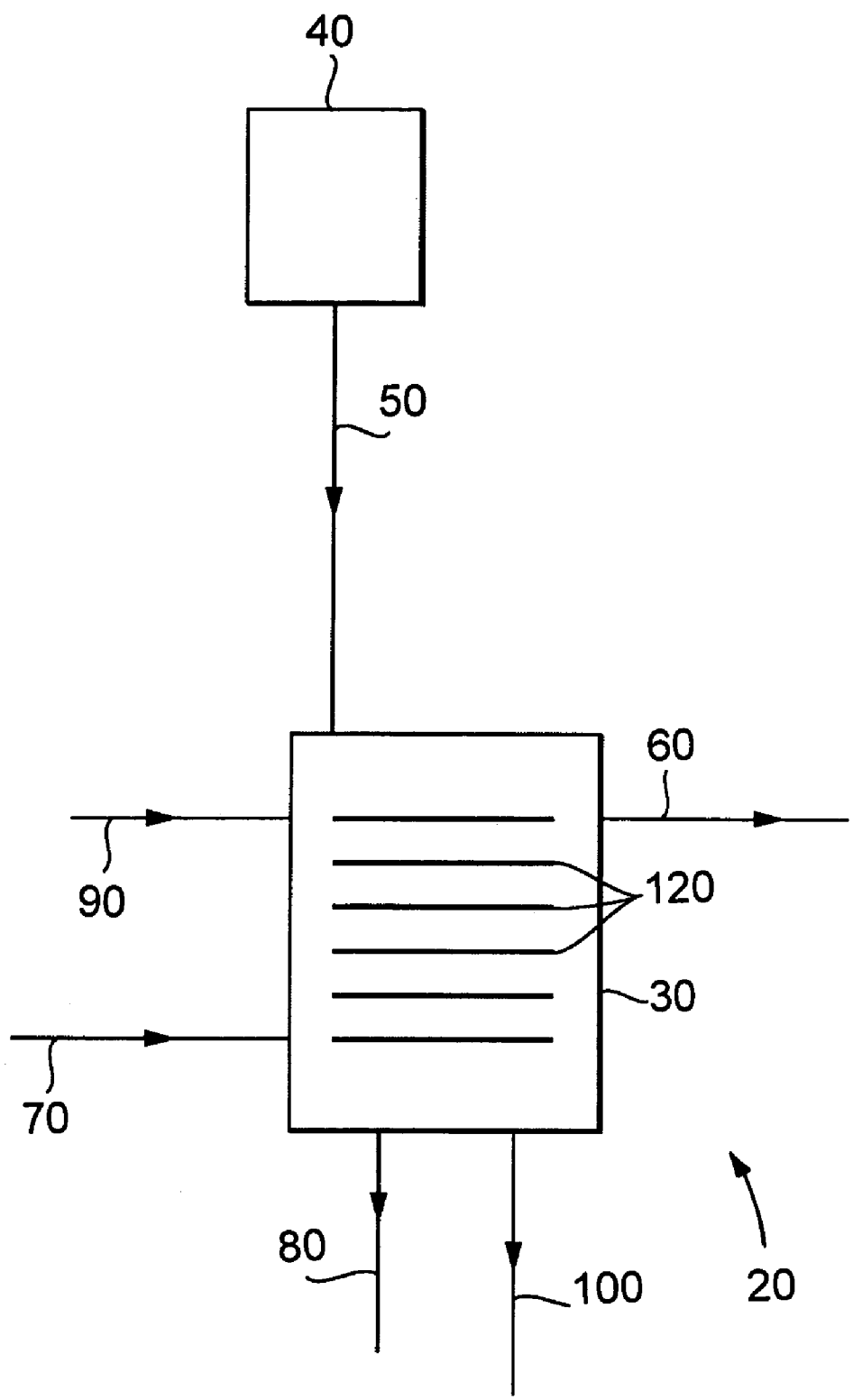
FIG. 1 is a schematic diagram of an embodiment of a fuel cell system.

FIG. 1 shows a fuel cell system 20 having a fuel cell stack 30 that includes a plurality of fuel cells 120. Fuel cell system 20 further includes an anode gas supply 40, an anode gas inlet line 50, an anode gas outlet line 60, a cathode gas inlet line 70, a cathode gas outlet line 80, a coolant inlet line 90, and a coolant outlet line 100. An example of a fuel cell system is the GenCore™ system (available from PlugPower, Latham, N.Y.).

Figure 2:
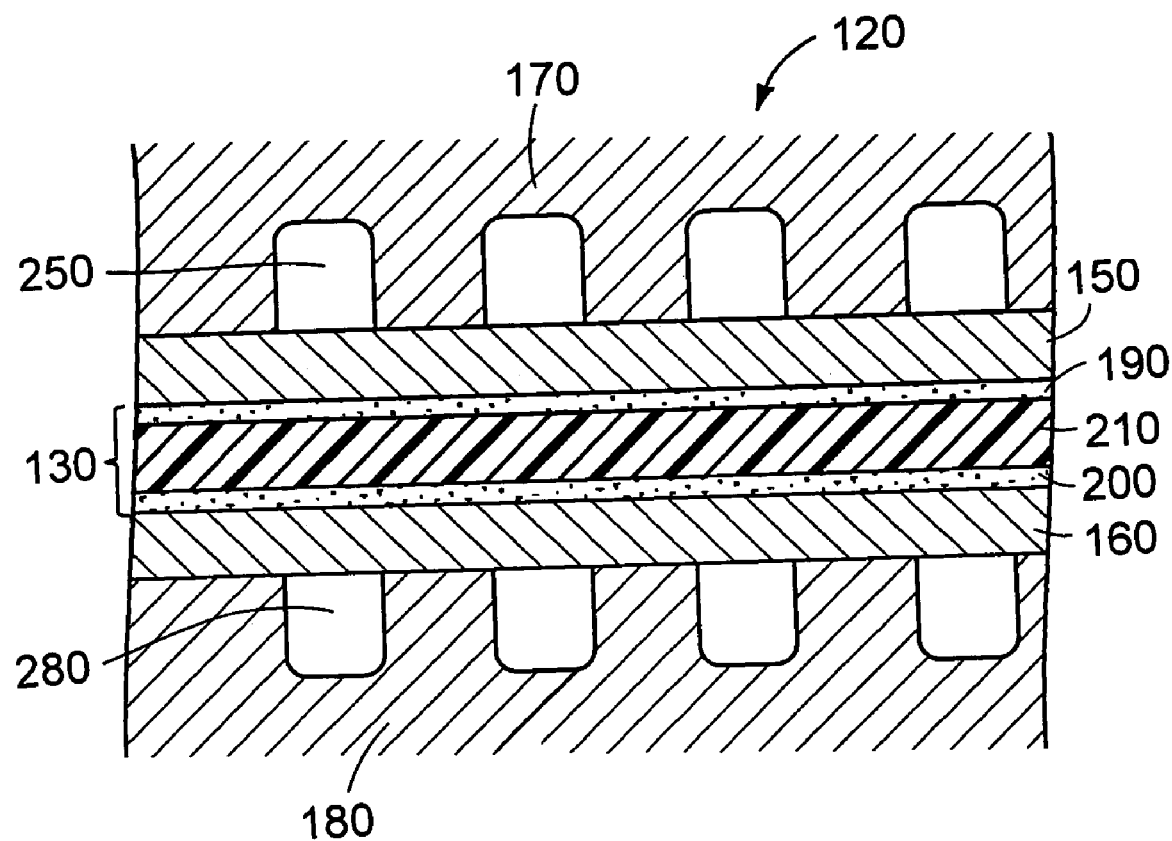
FIG. 2 is a partial cross-sectional view of an embodiment of a fuel cell.

Referring to FIG. 2, an embodiment of fuel cell 120 is shown having a membrane electrode assembly 130, gas diffusion layers (GDLs) 150 and 160, a cathode flow field plate 170, and an anode flow field plate 180. Membrane electrode assembly (MEA) 130 includes catalyst layers 190 and 200 and a solid electrolyte 210 between layers 190 and 200. Cathode flow field plate 170 has cathode gas channels 250, and anode flow field plate 180 has channels 280.

Prior to operating fuel cells 120 under their selected normal operating conditions, the fuel cells are pre-conditioned to enhance their performance. During the pre-conditioning or "break-in" period, it is believed that catalyst layers 190 and/or 200 are activated, i.e., the activity of catalyst material in layers 190 and/or 200 is enhanced. Consequently, catalyst utilization can increase, and thus, fuel cell performance can be enhanced.

Fuel cells 120 can be pre-conditioned by applying a material to either or both catalyst layers 190 and/or 200, and subsequently, removing the material. The material can be any material that can sorb on catalyst layer(s), and subsequently be stripped from the catalyst layer(s). For example, since carbon monoxide (CO) readily sorbs (e.g., adsorbs) to certain catalyst materials (such as platinum and/or ruthenium), carbon monoxide can be applied to the catalyst layer(s). Subsequently, the sorbed carbon monoxide can be oxidized to carbon dioxide ($CO_2$), which can easily desorb from the catalyst layer(s). Without wishing to be bound by theory, it is believed that the CO sorption/$CO_2$ desorption increases the accessibility of the catalyst layer(s) to reactants as the $CO_2$ is generated and released. The increased accessibility (e.g., increased surface area) provides catalyst sites that were inaccessible before pre-conditioning. As a result, catalyst utilization and performance are enhanced. Moreover, the oxidation of carbon monoxide clears sites previously blocked by the carbon monoxide for fuel cell reactants to adsorb on the catalyst layer.

Carbon monoxide sorption can be performed by contacting the selected catalyst layer(s) 190 and/or 200 with carbon monoxide gas. The particular conditions for carbon monoxide sorption can be determined experimentally, and can be a function of, for example, the catalyst loading in layer(s) 190 and/or 200, the surface area of the layer(s), the catalyst material, the concentration of carbon monoxide in the gas, and/or the temperature at which sorption is performed. In some embodiments, at least a monolayer of carbon monoxide is applied to catalyst layer(s) 190 and/or 200. In certain embodiments, to provide good sorption, the catalyst layer(s) at which sorption is performed is maintained at a potential (e.g., about 0.0–0.2 Volt vs. a standard hydrogen electrode (SHE)) that is lower than a potential capable of oxidizing carbon monoxide.

After the carbon monoxide is sorbed onto catalyst layer(s) 190 and/or 200, the carbon monoxide is oxidized and stripped from the catalyst layer(s). Oxidation can be performed electrochemically, for example, by scanning the potential of the catalyst layer(s) to higher oxidation potentials, e.g., up to about 1.0 Volt vs. SHE. The oxidation of carbon monoxide can be marked by a peak in the potential scan. Alternatively or in addition, oxidation can be performed chemically. For example, oxygen and/or water vapor can be applied to the pre-conditioning catalyst layer(s) at elevated temperatures to oxidize the sorbed carbon monoxide.

After the carbon monoxide is removed, the performance of fuel cell 120 can be determined under its selected operating conditions, e.g., by conducting a current-voltage (I-V) test. Fuel cell 120 can be pre-conditioned as described above repeatedly (e.g., two, three, four or more times) until no further enhancements in fuel cell performance are observed.

The sorption/desorption cycle(s) described herein can be applied to one or more fuel cells before and/or after they are incorporated into a fuel cell system. For example, prior to incorporating fuel cells into a fuel cell system, a manufacturer can performed the sorption/desorption cycle(s) described herein to optimize performance of the cells and provide an end user with an accurate measure of the performance of the fuel cell system during use. Alternatively or in addition, the end user can perform the sorption/desorption cycle(s) described herein to optimize performance of the fuel cell system. The cycle(s) can be performed on all fuel cells within a fuel cell stack, or on selected cells, such as by having fuel cells that are electrochemically individually addressable, e.g., with exposed contacts or current collector plates.

Turning back to the structure of fuel cell 120 shown in FIG. 2, electrolyte 210 should be capable of allowing ions to flow therethrough while providing a substantial resistance to the flow of electrons. In some embodiments, electrolyte 210 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 210 can also be prepared from the commercial product GORE-SELECT, available from W.L. Gore & Associates (Elkton, Md.).

Catalyst layer 200 can be formed of a material capable of interacting with hydrogen to form protons and electrons. Examples of such materials include, for example, platinum, platinum alloys, platinum dispersed on carbon black, and non-noble metal materials. Alternatively, a suspension is applied to the surfaces of gas diffusion layers (described below) that face solid electrolyte 210, and the suspension is then dried. During the preparation of MEA 130, catalyst material (e.g., platinum) can be applied to electrolyte 210 using standard techniques. The method of preparing layer 200 may further include the use of pressure and temperature (e.g., hot bonding) to achieve bonding.

Catalyst layer 190 can be formed of a material capable of interacting with oxygen, electrons and protons to form water. Examples of such materials include, for example, platinum, platinum alloys, noble metals dispersed on carbon black, and non-noble metal materials. Catalyst layer 190 can be prepared as described above with respect to catalyst layer 200.

Gas diffusion layers (GDLs) 150 and 160 are electrically conductive so that electrons can flow from catalyst layer 200 to flow field plate 180 and from flow field plate 170 to catalyst layer 190. GDLs can be formed of a material that is both gas and liquid permeable. It may also be desirable to provide the GDLs with a planarizing layer, as is known in the art, for example, by infusing a porous carbon cloth or paper with a slurry of carbon black followed by sintering with a polytetrafluoroethylene material. Suitable GDLs are available from various companies such as E-TEK, a division of De Nora (e.g., ELAT®) in Somerset, N.J., and Zoltek in St. Louis, Mo.

Methods of making membrane electrode assemblies and membrane electrode units are known, and are described, for example, in U.S. Pat. No. 5,211,984, which is hereby incorporated by reference.

Figure 3:
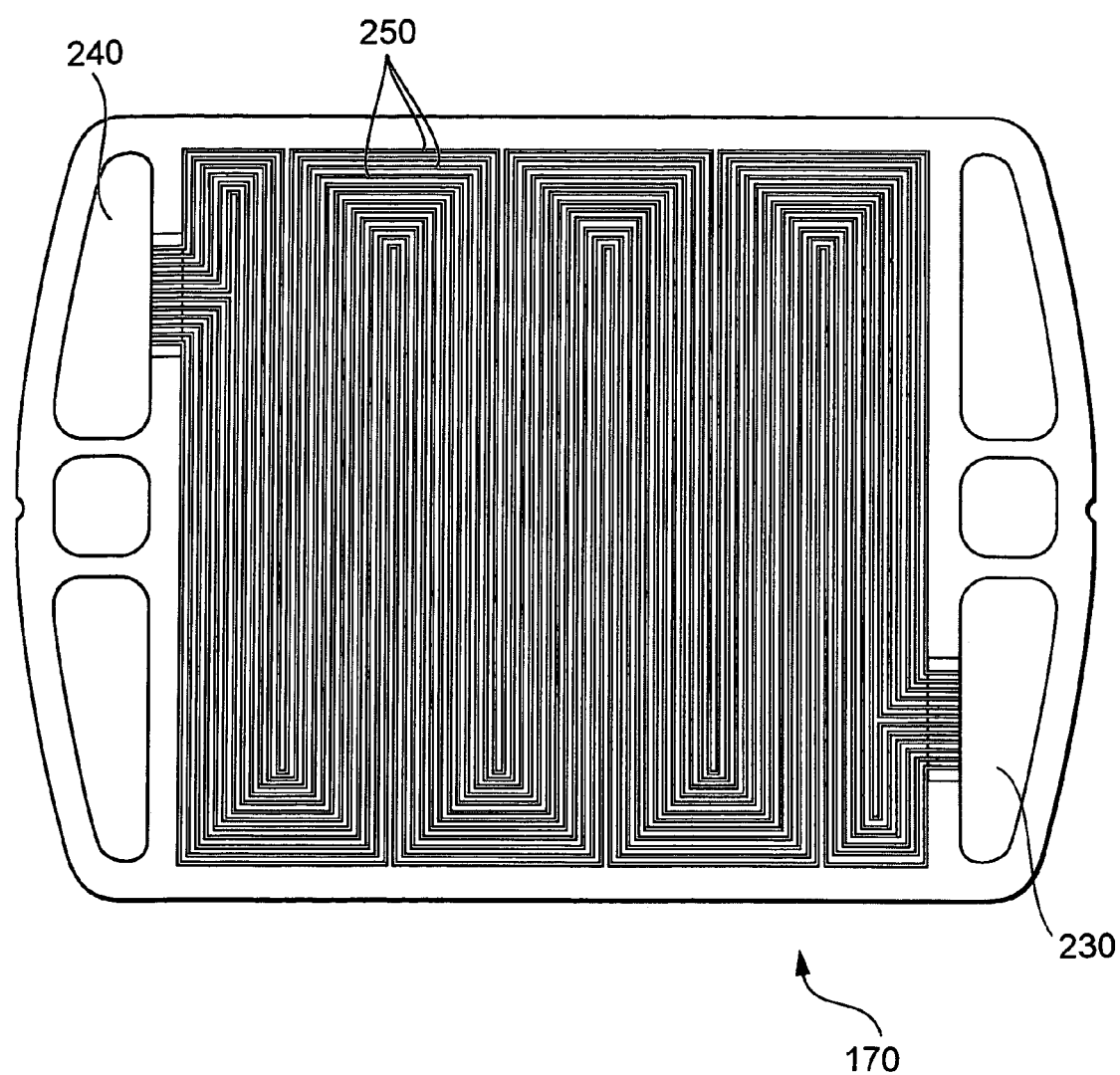
FIG. 3 is an elevational view of an embodiment of a cathode flow field plate.

FIG. 3 shows a cathode flow field plate 170 having an inlet 230, an outlet 240, and open-faced channels 250 that define a flow path for a cathode gas from inlet 230 to outlet 240. A cathode gas flows from cathode gas inlet line 70 and enters flow field plate 170 via inlet 230 to cathode outlet line 80. The cathode gas then flows along channels 250 and exits flow field plate 170 via outlet 240. As the cathode gas flows along channels 250, oxygen contained in the cathode gas can permeate gas diffusion layer 150 and interact with catalyst layer 190. Electrons and protons present at layer 150 react with the oxygen to form water. The water can pass back through diffusion layer 150, enter the cathode gas stream in channels 250, and exit plate 170 through cathode flow field plate outlet 240.

Figure 4:
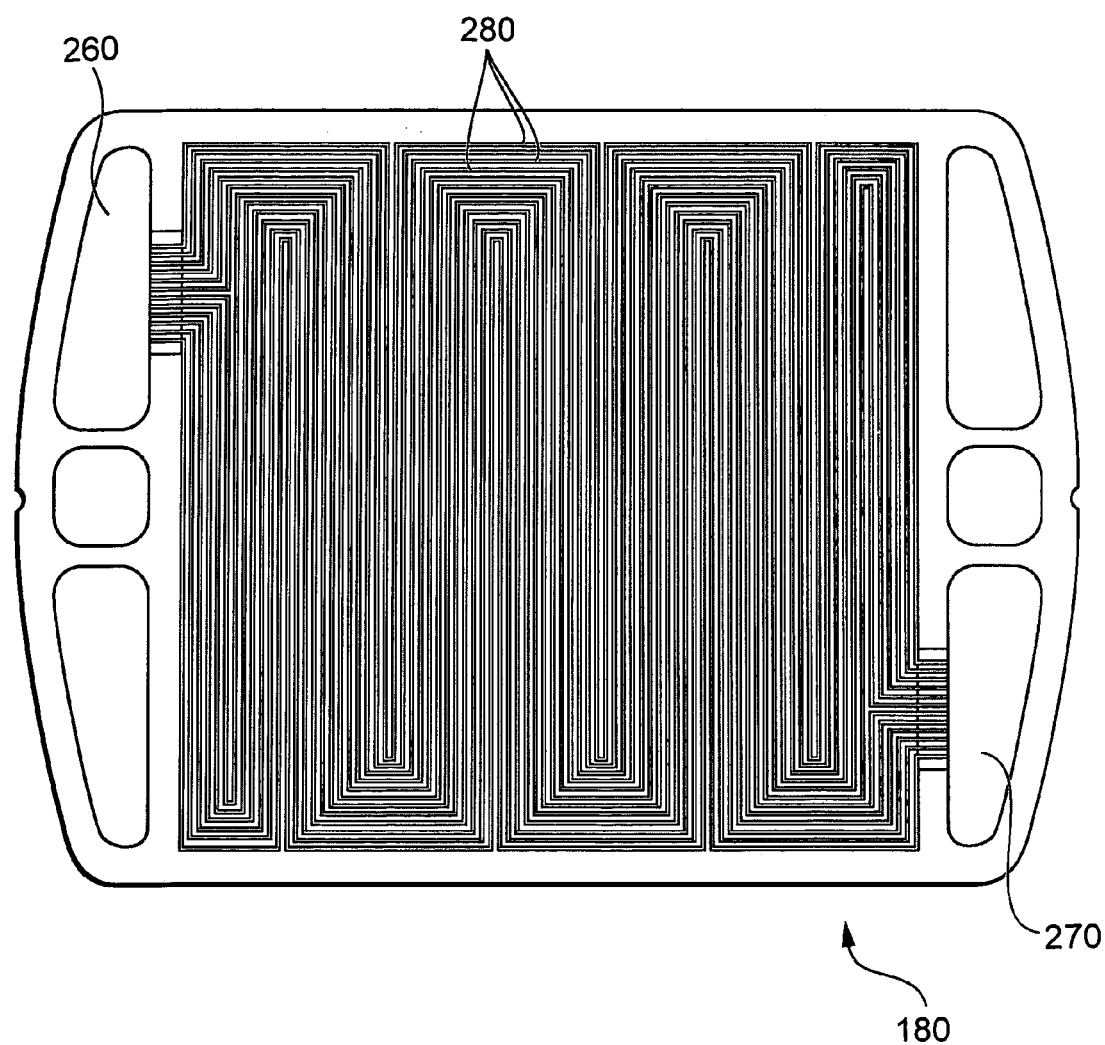
FIG. 4 is an elevational view of an embodiment of an anode flow field plate.

FIG. 4 shows an anode flow field plate 180 having an inlet 260, an outlet 270, and open-faced channels 280 that define a flow path for an anode gas from inlet 260 to outlet 270. An anode gas flows from the anode gas inlet line 50 and enters flow field plate 180 via inlet 260. The anode gas then flows along channels 280 and exits flow field plate 180 via outlet 270 to anode outlet line 60. As the anode gas flows along channels 280, hydrogen contained in the anode gas can permeate gas diffusion layer 160 and interact with catalyst layer 200 to form protons and electrons. The protons pass through solid electrolyte 210, and the electrons are conducted through gas diffusion layer 160 to anode flow field plate 180, ultimately flowing through an external load to cathode flow field plate 170.

Figure 5:
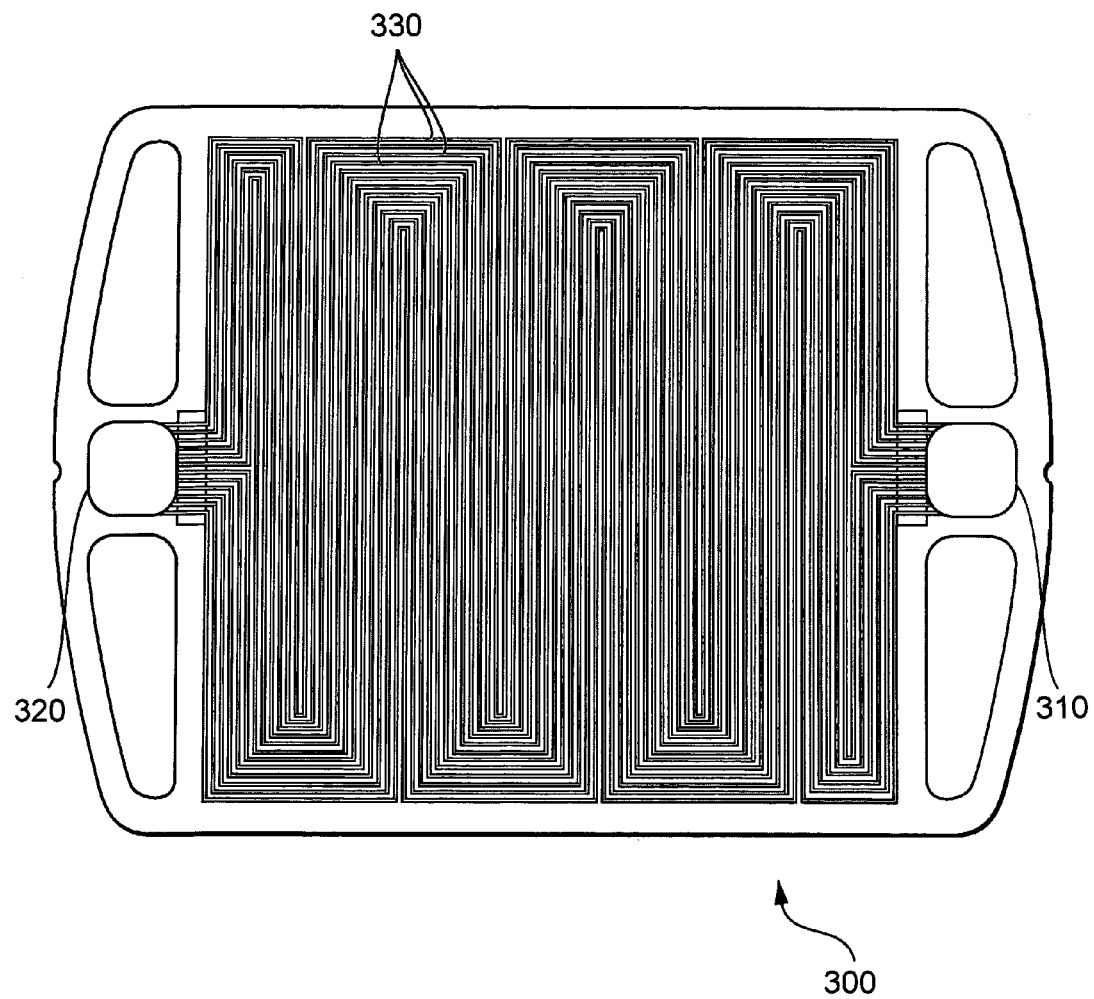
FIG. 5 is an elevational view of an embodiment of a coolant flow field plate.

Heat produced during the fuel cell reaction is removed from fuel cell 120 by flowing a coolant through fuel cell 120 via a coolant flow field plate. FIG. 5 shows a coolant flow field plate 300 having an inlet 310, an outlet 320 and open-faced channels 330 that define a flow path for coolant from inlet 310 to outlet 320. The coolant enters fuel cell 120 from coolant inlet line 90 via inlet 310, flows along channels 330 and absorbs heat, and exits fuel cell 120 via outlet 320 to coolant outlet line 100.

Fuel cells 120 are arranged within fuel cell stack 30 such that inlets 260 are configured to be in fluid communication with anode gas inlet line 50, and outlets 270 are configured to be in fluid communication with anode gas outlet line 60.

Similarly, inlets 230 are configured to be in fluid communication with cathode gas inlet line 70, and outlets 240 are configured to be in fluid communication with cathode gas outlet line 80. Likewise, inlets 310 are configured to be in fluid communication with coolant inlet line 90, and outlets 320 are configured to be in fluid communication with coolant gas outlet line 100.

While certain embodiments have been described, other embodiments are contemplated. For example, fuel other than hydrogen, e.g., methane or propane, can be introduced to a fuel cell system and the fuel cells. The fuel cells can be direct methanol fuel cells (DMFCs), which are described, for example, in U.S. Pat. Nos. 4,478,917; 5,599,638; and 6,248,460 B1.

Alternatively or in addition to carbon monoxide, materials with similar sorption/desorption properties, such nitrogen oxides and sulfur oxides, can be sorbed and desorbed to pre-condition fuel cells.

In some embodiments, GDLs 150 and/or 160 can be pre-conditioned as described herein.

The sorption/desorption pre-conditioning methods described herein can be used in combination with other pre-conditioning methods. An example of another pre-conditioning method is described in U.S. Ser. No. 10/072,592, filed Feb. 11, 2002, which includes operating fuel cell(s) above ambient conditions (e.g., elevated temperatures and pressures) prior to operating the cell(s) under normal operating conditions. Another example of a pre-condition method is described in U.S. Ser. No. 10/097,216, filed Mar. 14, 2002, which includes evolving hydrogen at one or more electrode being pre-conditioned. Both applications are hereby incorporated by reference in their entirety.

The sorption/desorption pre-conditioning methods described herein, alone or in combination with other pre-conditioning methods, can be used at any time during the life of a fuel cell or a fuel cell system. For example, the methods can be used to re-activate the catalyst layer(s), and/or to eliminate carbon monoxide that has poisoned the catalyst layer(s). The methods can include both the sorption step and the desorption step, or only the desorption step.

The following examples are illustrative and not intended to be limiting.

EXAMPLES

A catalyst mixture containing 30% Nafion® (DuPont) and 70% 20% Pt/Vulcan XC-72 (E-tek, Inc.) was thoroughly stirred and sonicated. The catalyst mixture was then applied onto a gas diffusion medium (ELAT® from Zoltek) to form an electrode. The electrode was air dried, followed by further drying in an oven at 135° C. for 30 minutes. The weight difference between the bare gas diffusion medium and the catalyzed gas diffusion medium indicated a Pt loading of about 0.17 mg/cm$^2$. The electrode was then hot-bonded at 130° C. for three minutes to a Nafion® 112 membrane with a second electrode to form a membrane electrode assembly (MEA). The second electrode had a Pt loading higher than 1.0 mg/cm$^2$ and was used as an anode in the following tests. The high Pt loading of the anode allowed the cathode (with lower Pt loading) to be evaluated, i.e., the anode was not limiting the performance of the MEA.

Single fuel cell tests were performed using a test fixture having a ten-square-centimeter active area. The test fixture included a pair of metal plates with serpentine flow-fields. The plates were coated with a metal nitride for corrosion protection. Rod-like heaters were inserted into the plates to control the cell temperature. During fuel cell measurements, the load was varied using a rheostat when voltage (V)—current density (I) curves were collected.

The reactants included air and pure hydrogen. The reactants were humidified by passing the gases through stainless steel water bottles prior to contacting the cell. The cell temperature, hydrogen humidification temperature, air humidification temperature, hydrogen back pressure, and air back pressure are denoted hereinafter as $T_{cell}$, $T_{H2}$, $T_{air}$, $P_{H2}$, and $P_{air}$, respectively. For example, a cell temperature of 75° C., a hydrogen humidification temperature of 95° C., air humidification temperature of 90° C., hydrogen backpressure of 20 psig, and air backpressure of 30 psig, are expressed as 75/95/90° C., 20/30 psig. The stoichiometries of air and hydrogen were controlled to about 10 using flow meters at a current density of 2.0 A/cm$^2$.

Cyclic voltammetry of CO oxidation was performed using a Solartron SI 1280B electrochemical measurement unit. During the CO adsorption process, a mixed gas containing 0.5% CO (balanced by 99.5% nitrogen) was used at on cathode side, and the cathode voltage was set at 0.50 V (vs. SHE). Potential scanning was performed between 0.5 and 1.0 V at a scan rate of 30 mV/s in the presence of nitrogen.

Figure 6:
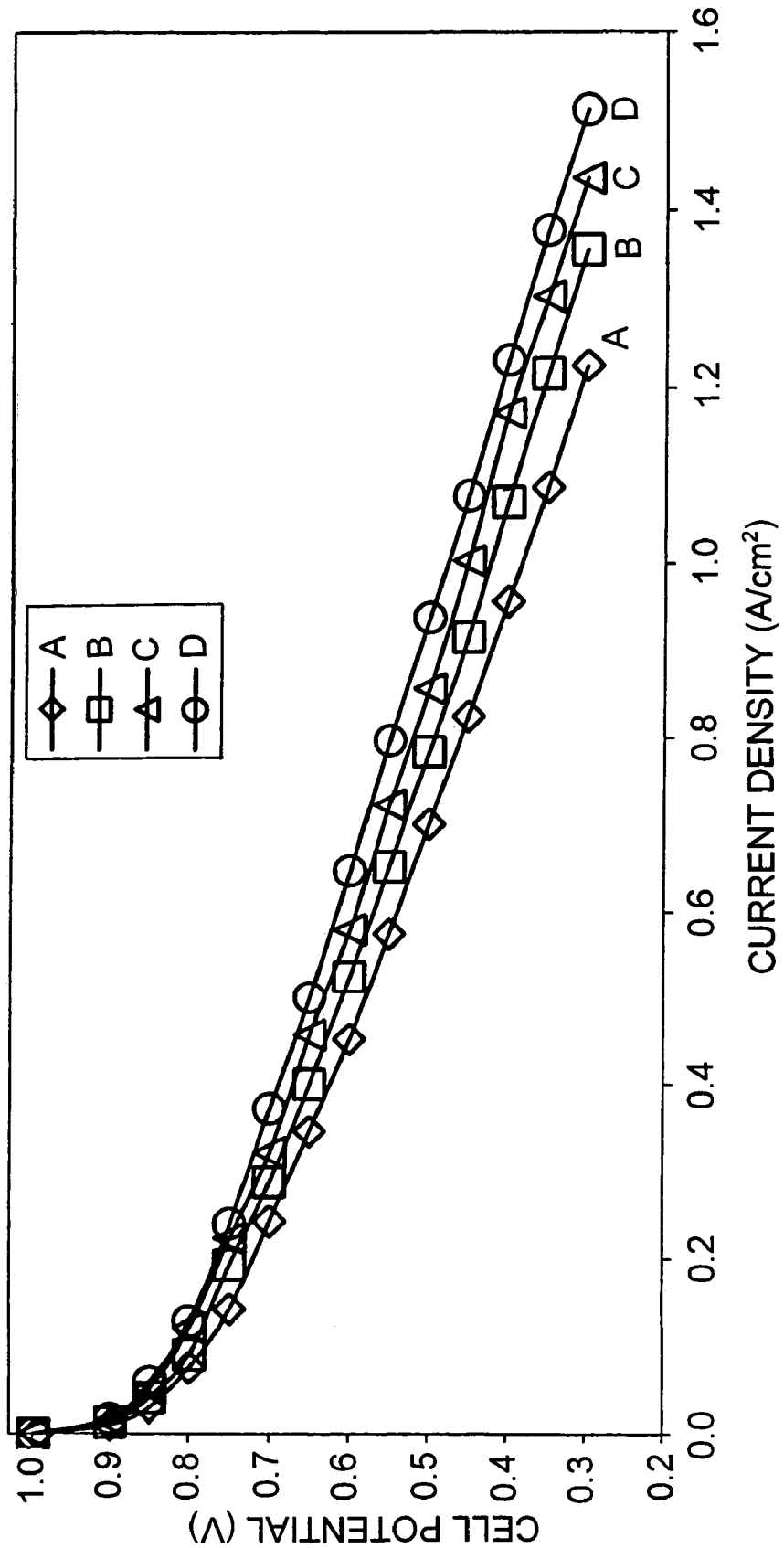
FIG. 6 is a plot of cell potential (V) versus current density ($A/cm^2$) after certain pre-conditioning cycles.

A comparative "break in" was performed on the fuel cell using pure hydrogen and air as the reactant gases. The cell was operated at 35/45/45° C. ($T_{cell}/T_{H2}/T_{air}$) for several hours. During this period, the fuel cell was set at around 0.4 V for most of the time; and periodically, the cell voltage was scanned from open circuit to nearly 0 V. Every 30 minutes, a V-I curve was taken. The performance of the fuel cell increased gradually, but after about 3 hours, little further increase in performance was observed. Referring to FIG. 6, the maximum performance of the MEA achieved by performing the above comparative break-in procedure is shown as Curve A.

Figure 7:
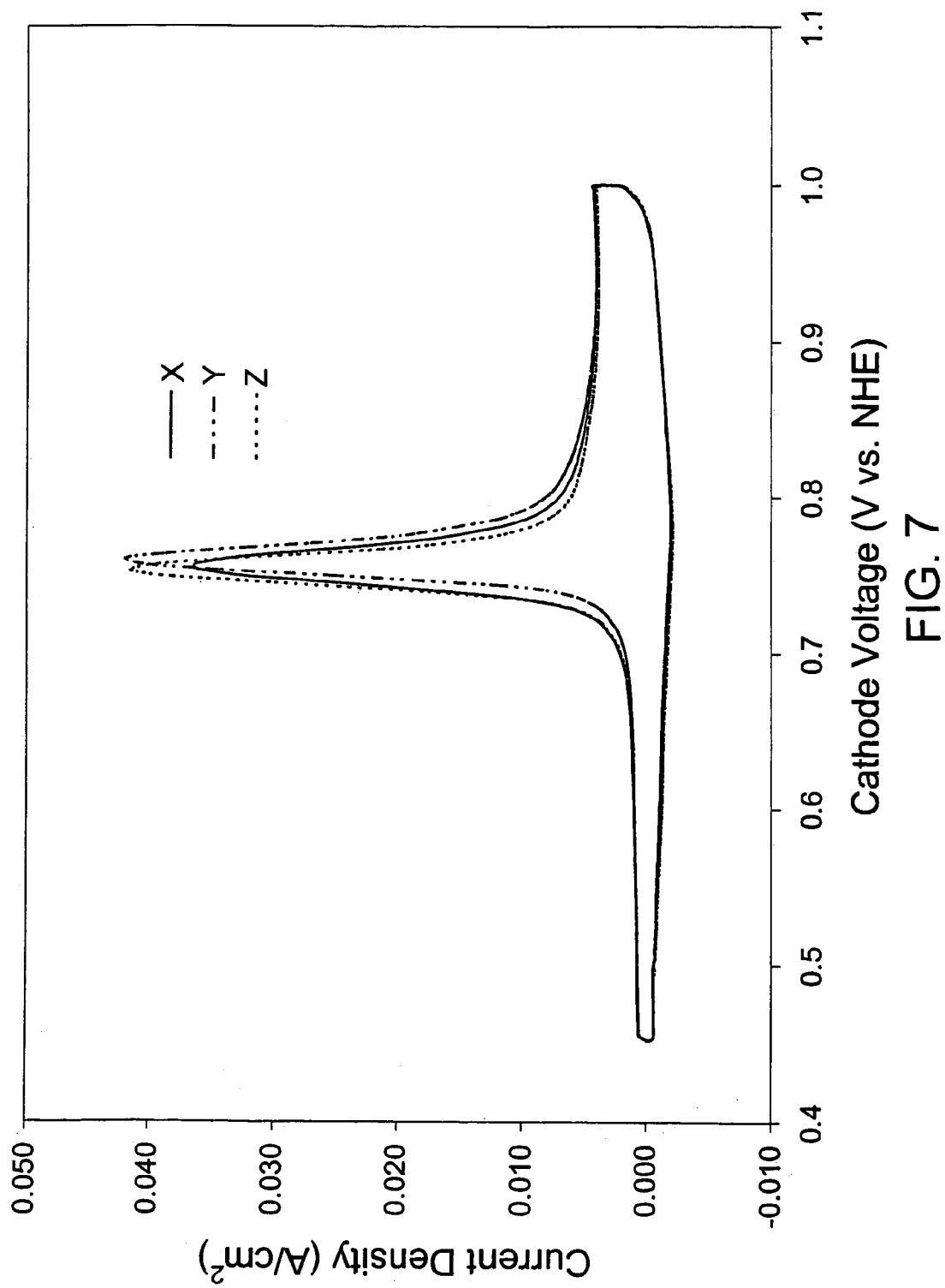
FIG. 7 is a plot of cyclic voltammograms from oxidation of carbon monoxide.

The effect of CO sorption and oxidation was then determined. The cell was set to open circuit, and air was replaced by nitrogen gas to contact the cathode. After about 30 minutes, the nitrogen gas was replaced by the mixed gas containing 0.5% CO, and the cathode of the cell was controlled at 0.5 V (vs. SHE). Since CO can strongly adsorb onto the catalyst, the cathode was quickly poisoned. The adsorption was continued for about 30 minutes to increase coverage of CO on the cathode Pt catalyst. If a higher CO concentration were used, shorter adsorption times would be needed. Then, the mixed gas was replaced by nitrogen to flush out of the cathode compartment any CO that did not adsorb onto the catalyst. Next, the cathode potential was scanned (a cyclic voltammogram) from about 0.5 to 1.0 V for three times. Referring to FIG. 7, curve X shows a sharp peak, believed to be a CO oxidative stripping peak, at about 0.76 V was observed during the first cathodic scan. No other peak was observed during the second and third scans. It is believed that, during the first can, CO was oxidized to $CO_2$, which stripped off the catalyst surface.

After the above CO oxidative stripping experiment, air was introduced to the cathode, the cell was tested (under operating conditions at 35° C.), and a second V-I measurement was taken, shown as curve B in FIG. 1. Curve B was visibility higher than curve A for the entire current density region measure. It is believed that the CO adsorption/$CO_2$ desorption cycle increased the performance of the fuel cell over the observed performance maximum from the above break-in procedure.

The above cycle and measurements were repeated on the same cell. When another CO adsorption/$CO_2$ desorption cycle was performed according to the above procedure, the CO oxidation peak (shown as curve Y in FIG. 7) was about 5% larger than the first peak (curve X in FIG. 7). It is believed that the first CO adsorption/$CO_2$ desorption cycle increased the catalyst surface area available for reaction. When the fuel cell performance was measured after this second CO adsorption/$CO_2$ desorption cycle, a further increase was observed, as shown by curve C in FIG. 6, possibly indicating a further increase in surface area due to the second CO adsorption/$CO_2$ desorption process.

A CO adsorption/$CO_2$ desorption cycle was performed for a third time. Curve Z in FIG. 7 shows the first cyclic voltammogram, whose peak had a height similar to that of the peak of curve Y, suggesting that the third CO adsorption/$CO_2$ desorption cycle did not significantly increase catalyst surface area for CO adsorption. However, when the cell was tested under the same operating conditions, another increase was observed, as shown by curve D in FIG. 6.

A fourth CO adsorption/$CO_2$ desorption cycle was also performed, and a cyclic voltammogram curve similar to curves Y and Z was obtained. When the fuel cell was tested under the same operating conditions, no increase in performance was observed. It is believed that the maximum activation effect had been achieved after the first three CO adsorption/$CO_2$ desorption cycles.

To determine how much activation had been achieved by the four CO adsorption/$CO_2$ desorption cycles, another MEA with the same composition was activated according to the procedures described in U.S. Ser. No. 10/072,592, filed on Feb. 11, 2002, by Qi et al. The procedures of the Qi application includes activating a low temperature PEM fuel cell by first operating the cell at elevated temperature and pressure. The test cell was operated at 75/95/90° C. and 20/30 psig for 2 hours, and then at 35/45/45° C., and the performance was measured as above. Table 1 summarizes the maximum observed performance (e.g. current density at 0.4 V) achieved by the break-in procedure described above, the CO adsorption/$CO_2$ desorption cycles described above, and the elevated temperature and pressure method described in U.S. Ser. No. 10/072,592. The activation using elevated temperature and pressure achieved higher (about 9%) maximum performance than the CO adsorption/$CO_2$ desorption cycles; and the CO adsorption/$CO_2$ desorption cycles achieved a higher (about 29%) maximum performance than the break-in method.

TABLE 1

Comparisons of break-in, CO adsorption/$CO_2$ desorption, and elevated temperature and pressure methods
Current density at 0.40 V (A/cm$^2$)

| Break-in | 1$^{st}$ CO/$CO_2$ | 2$^{nd}$ CO/$CO_2$ | 3$^{rd}$ CO/$CO_2$ | Elevated T/P |
|---|---|---|---|---|
| 0.956 | 1.071 | 1.172 | 1.232 | 1.342 |

While activation by CO adsorption/$CO_2$ desorption is less effective than activation using elevated temperature and pressure, the adsorption/desorption cycling method can be used when elevated temperature and pressure conditions cannot be easily achieved. Activation by adsorption/desorption can achieve enhanced performance over certain break-in methods.

All references, including patents, applications, and publications, referred to herein are incorporated by reference in their entirety.

Other embodiments are within the claims.

What is claimed is:

1. A method, comprising:
   sorbing carbon monoxide to a catalyst layer of a fuel cell; and
   oxidizing the carbon monoxide,
   wherein the sorbing and oxidizing are performed before the fuel cell is operated.

2. The method of claim 1, further comprising, during sorption of carbon monoxide, maintaining the potential of the catalyst layer at a first potential less than the oxidation potential of carbon monoxide.

3. The method of claim 2, wherein the first potential is from about 0.2 to about 0.5V versus a standard hydrogen electrode.

4. The method of claim 1, comprising electrochemically oxidizing the carbon monoxide.

5. The method of claim 4, comprising scanning the potential of the catalyst layer.

6. The method of claim 1, comprising chemically oxidizing the carbon monoxide.

7. The method of claim 6, wherein chemically oxidizing the carbon monoxide comprises contacting the catalyst layer with oxygen or water.

8. The method of claim 1, further comprising, after oxidizing the carbon monoxide, sorbing carbon monoxide to the catalyst layer, and oxidizing the carbon monoxide.

9. The method of claim 1, further comprising incorporating the fuel cell into a fuel cell stack.

10. The method of claim 1, wherein the fuel cell is a part of a fuel cell stack.

11. The method of claim 1, further comprising contacting the catalyst layer with a fuel.

12. The method of claim 11, wherein the fuel comprises hydrogen or methanol.

13. The method of claim 1, further comprising contacting the catalyst layer with an oxidant.

14. The method of claim 1, wherein the fuel cell comprises a proton-exchange membrane.

15. A method, comprising:
   sorbing a first material other than a fuel to a catalyst layer of a fuel cell; and
   oxidizing the first material from the catalyst layer,
   wherein the sorbing and oxidizing are performed before the fuel cell is operated.

16. The method of claim 15, wherein the first material comprises carbon monoxide.

17. The method of claim 15, comprising electrochemically oxidizing the first material.

18. The method of claim 15, further comprising repeating the sorbing and oxidizing of the first material.

19. The method of claim 15, further comprising incorporating the fuel cell into a fuel cell system.

20. The method of claim 15, wherein the fuel cell is a part of a fuel cell stack.

21. A method, comprising:
   operating a fuel cell;
   turning the fuel cell off;
   after the turning the fuel cell off, sorbing carbon monoxide to a catalyst layer of the fuel cell; and
   after sorbing the carbon monoxide, oxidizing the carbon monoxide,
   wherein the sorbing and oxidizing are performed when the fuel cell is not operating.

22. A method, comprising:

operating a fuel cell;

turning the fuel cell off;

after turning the fuel cell off, sorbing a first material other than a fuel to a catalyst layer of a fuel cell; and after sorbing the first material, oxidizing the first material from the catalyst layer, wherein the sorbing and oxidizing are performed when the fuel cell is not operating.

* * * * *